United States Patent Office 3,296,326
Patented Jan. 3, 1967

3,296,326
PROCESS FOR RECOVERY OF DIETHYLENE GLYCOL MONOALKYL ETHER IN AN ACETYLIN RECOVERY PROCESS
Eugene Marvin Kling, Montague, Mich., assignor to E. I. du Pont de Nemours and Company, Wilmington, Del., a corporation of Delaware
No Drawing. Filed June 8, 1964, Ser. No. 373,555
9 Claims. (Cl. 260—678)

This invention relates to the manufacture of monovinylacetylene by passing acetylene through an aqueous cuprous chloride catalyst containing the monoalkyl ether of diethylene glycol as a separate phase and more particularly, to the recovery of alkyl ether lost from the catalyst by evaporation during this manufacture.

In one continuous process for making monovinylacetylene, acetylene is partly converted to monovinylacetylene and minor amounts of higher polymers of acetylene such as divinylacetylene and tarry products, by passage through a catalyst. A suitable catalyst is a slightly acidic water solution of cuprous and potassium chlorides, containing, as a coarsely dispersed separate phase, the monoalkyl ether of diethylene glycol which serves to increase the conversion to monovinylacetylene and to collect the tarry by-products which are formed in small amounts. This catalyst is described in U.S. Patent No. 2,914,587. The vapor phase leaving the catalyst, for example at about 70° C., is composed of acetylene, mono- and divinyl acetylenes, water, and small amounts of the alkyl ether.

The monovinylacetylene may be separated from the acetylene by differential solution in certain solvents such as acetone, as described in British Patent No. 797,120. The acetylene is then recycled. If this method is chosen, with acetone as solvent, it is important to dry the reaction gas first in order to prevent water from entering the acetone, since such dilution decreases the solvent power of the acetone. Accordingly, the gas from the reactor is first cooled and compressed, yielding, in addition to some divinylacetylene, an aqueous condensate containing dissolved diethylene glycol monoalkyl ether. This glycol ether solution is too dilute to be returned as such to the catalyst or to have the glycol ether economically recovered by ordinary distillation or extraction. Accordingly, an inexpensive and effective way to recover the glycol for reuse in the catalyst is required.

Therefore, an object of the present invention is to provide an improved process for recovering the diethylene glycol monoalkyl ether in a form which is returnable to the catalyst body hereinbefore described. Other objects will appear hereinafter.

It has now been found that the diethylene glycol monoalkyl ether can be isolated from the aqueous condensate described above by contacting activated charcoal with said condensate, whereby the ether therein is absorbed into the charcoal, and then by extracting the absorbed ether with acetone. The resultant extract can be recycled to the main catalyst body.

In the context of the manufacture of monovinylacetylene by the steps of passing acetylene through an aqueous catalyst solution of cuprous chloride and potassium chloride containing diethylene glycol monoalkyl ether as a dispersed phase, condensing the water vapor present in the exit gas, and extracting the monovinylacetylene from the said exit gas by preferential solution in acetone, the present invention constitutes the improvement of recovering the diethylene glycol monoalkyl ether present in the condensate formed during the condensing step by absorbing the condensed ether into activated carbon, extracting it therefrom with acetone, and returning the resultant extract containing the diethylene glycol monoalkyl ether to the catalyst solution. Unexpectedly, the presence of acetone in the extract, which would be expected to precipitate the active ingredients, does not interfere with the catalytic process of making and isolating the monovinylacetylene. The acetone, which is returned to the catalyst body, vaporizes and passes to the column in which the monovinylacetylene is separated by solution in acetone. The acetone already present in the stream serves to presaturate the stream in part.

The dilute aqueous solution of the diethylene glycol monoalkyl ether coming from the monovinylacetylene process contains small amounts of acetone, arising from the acetone solution returned to the catalyst and from the recirculated acetylene which carries a small amount of it from the step in which the monovinylacetylene is preferentially absorbed. Other aqueous solutions containing the ether and acetone, originating elsewhere in the process, may be added. If the acetone concentration in the solution to be worked up according to the present invention is more than 1% by weight, it interferes with the separation of the ether, as explained below. Such solutions are therefore first distilled to remove most of the acetone in substantially anhydrous forms for reuse, leaving a residue containing 1% by weight or less.

Suitable alkyl ethers for use in the present invention include those in which the alkyl group contains from 1 to 8 carbon atoms; the monobutyl ether of ethylene glycol is preferred however for the reasons pointed out in U.S. Patent No. 2,914,587. The water solution treated in the present invention may contain as much as 0.5% by weight of the diethylene glycol monobutyl ether and as little as 0.05% by weight. The average is 0.15. These values may vary somewhat according to the particular alkyl ether employed. The water solution should contain less than about 1% by weight acetone since larger proportions of acetone significantly reduce the absorption of the ether from the water phase. The proportion of acetone used in extracting the ether from the carbon should be such as to give a solution containing less than about 10% by weight of ether compound. More acetone, giving more dilute solutions, is more efficient for extraction but should not, in general, be more than enough to give a 1% by weight or less solution of the ether.

Although the process of absorption from the water solution is operable as high as 90° C., the efficiency of absorption increases as the temperature is decreased. Temperatures between 20° and 30° C. are practical and even lower temperatures are desirable, provided that the cost of additional cooling is reasonable. Low rates of flow through the activated charcoal for both water solution and acetone are more efficient but must be balanced against the size of equipment required for a given rate of production. Any activated charcoal having absorptive power for the ether compound present in the water solution is suitable. The charcoal is preferably in the form of granules of such size and shape that a bed allows ready passage of the liquid to be treated. An example of a suitable activated charcoal is Type SGL, obtainable from the Pittsburgh Chemical Co. "Activated," as here used to modify carbon or charcoal refers to the process of heating to 800–900° C. with steam to increase its absorptive power, or the similar processes having the same effect.

*Example*

This example is illustrative of the improved process of the present invention and accordingly this invention is not limited hereto. Parts and percents are by weight unless otherwise noted.

A water solution of 0.36% monobutyl ether of diethylene glycol and 0.3% of acetone is passed through a column of 732 g. of 30 mesh Type SGL activated carbon contained in 10 ft. of 1-inch pipe at a rate of 400 cc./min. All operations are carried out at about 25° C. The water solution represents the residue obtained by recovering most of the acetone by distillation from the dilute aqueous solution of the butyl ether as previously described. After the activated charcoal has been conditioned by a preliminary absorption of the butyl ether from this water solution and leaching with acetone, then washing with water, 33,000 g. of the solution is pumped up through the carbon at a rate of 400 cc./min. This is followed by 2,500 g. of acetone at a rate of 10 cc./min. The water solution after passage through the carbon contains 0.054% or 17.8 g. of the glycol ether (that is, 101 g. had been absorbed). The acetone extract contains 3.6% or 90 g. of the diethylene glycol monobutyl ether and 9.6% or 260 g. of water. The charcoal is then ready for the absorption of more ether.

The acetone extract containing the diethylene glycol monobutyl ether is fed directly to the reactor containing the cuprous chloride catalyst, along with the make-up butyl ether, which is accordingly greatly reduced in amount because of the recovery effected by the present invention. The recovered and make-up ether are preferably fed at rates such as to keep the concentration in the catalyst constant. Any water in the acetone extract similarly serves to reduce the amount of water normally fed to make up for evaporation from the catalyst. The acetone introduced similarly reduces the amount which is added later in the process in the step in which the monovinylacetylene is preferentially dissolved.

As already stated, the introduction of acetone into the catalyst does not alter its efficiency.

As many widely different embodiments of this invention may be made without departing from the spirit and scope thereof, it is to be understood that this invention is not limited to the specific embodiments thereof except as defined in the appended claims.

What is claimed is:

1. In the process of manufacturing monovinylacetylene by the steps of passing acetylene through an aqueous catalyst solution of cuprous chloride and potassium chloride containing diethylene glycol monoalkyl ether, in which the alkyl group contains from one to eight carbon atoms, as a dispersed phase, condensing the water vapor present in the exit gas from said catalyst solution, and extracting the monovinylacetylene from the remaining exit gas by preferential solution in acetone, the improvement comprising recovering the diethylene glycol monoalkyl ether from the condensate formed during the condensing step by absorbing said ether into activated charcoal, extracting the absorbed ether from said charcoal with acetone, and returning the resultant extract to said catalyst solution.

2. The process as recited in claim 1 wherein said condensate contains less than 1% by weight of acetone.

3. The process as recited in claim 1 wherein said absorbing is carried out by contacting said activated charcoal with said condensate.

4. The process as recited in claim 1 wherein said absorbing is carried out at temperatures between 20 to 40° C.

5. The process as recited in claim 1 wherein sufficient acetone is used in the extracting step to give an extract containing less than about 10% by weight of said ether.

6. The process as recited in claim 1 wherein said ether is diethylene glycol monobutyl ether.

7. In the process of manufacturing monovinylacetylene by the steps of passing acetylene through an aqueous catalyst solution of cuprous chloride and potassium chloride containing diethylene glycol monoalkyl ether, in which the alkyl group contains from one to eight carbon atoms, as a dispersed phase, condensing the water vapor present in the exit gas from said catalyst solution, and extracting the monovinylacetylene from the remaining exit gas by preferential solution in acetone, the improvement comprising recovering the diethylene glycol monoalkyl ether from the condensate formed during the condensing step by reducing the concentration of said ether in said condensate to less than about 1% by weight, passing said condensate through activated charcoal, whereby the ether in said condensate is absorbed by said charcoal extracting the absorbed ether from said charcoal with acetone, and returning the resultant extract to said catalyst solution.

8. The process as recited in claim 7 wherein sufficient acetone is used in the extracting step to give an extract containing less than about 10% by weight of said ether.

9. In the process of manufacturing monovinylacetylene by the steps of passing acetylene through an aqueous catalyst solution of cuprous chloride and potassium chloride containing diethylene glycol monobutyl ether as a dispersed phase, condensing the water vapor present in the exit gas from said catalyst solution, and extracting the monovinylacetylene from the remaining exit by preferential solution in acetone, the improvement comprising recovering the diethylene glycol monobutyl ether from the condensate formed during the condensing step by reducing the concentration of said ether in said condensate to less than about 1% by weight, passing said condensate through activated charcoal, whereby the ether in said condensate is absorbed by said charcoal, extracting the absorbed ether from said charcoal with acetone, and returning the resultant extract to said catalyst solution.

References Cited by the Examiner

FOREIGN PATENTS 1,061,774   7/1959   Germany.

ALPHONSO D. SULLIVAN, *Primary Examiner.*